E. M. JONES.
AUTOMATIC AIR CONTROLLING DEVICE FOR VEHICLE BRAKES.
APPLICATION FILED SEPT. 4, 1913.

1,167,569.

Patented Jan. 11, 1916.

UNITED STATES PATENT OFFICE.

ELMER M. JONES, OF ATLANTA, GEORGIA, ASSIGNOR TO JONES SIGNAL SYSTEM COMPANY, OF ATLANTA, GEORGIA, A CORPORATION OF GEORGIA.

AUTOMATIC AIR-CONTROLLING DEVICE FOR VEHICLE-BRAKES.

1,167,569.  Specification of Letters Patent.  Patented Jan. 11, 1916.

Application filed September 4, 1913. Serial No. 788,185.

*To all whom it may concern:*

Be it known that I, ELMER M. JONES, a citizen of the United Sates, residing at Atlanta, in the county of Fulton and State of Georgia, have invented a certain new and useful Improvement in Automatic Air-Controlling Devices for Vehicle-Brakes, of which the following is a full, clear, and exact description, reference being had to the accompanying drawings.

This invention relates to the automatic control of the air brakes on vehicles having a direct air system.

My invention provides means whereby, at periodic intervals along the trackway, mechanism on a vehicle may be engaged and operated to connect the air reservoir with the brake cylinder.

One of the objects of the invention is to provide such mechanism in a form which shall not interfere with the hand application of the brake by the attendant on the car.

Another object is to prevent the attendant from throwing off the air when it is once applied by the automatic system until the car has come to a stop, or substantially a stop.

A third object is to provide a device which may be coupled directly with the existing direct air systems with very slight changes.

Though not limited thereto, my invention is particularly well adapted for electric cars wherein there is an air reservoir supplying air directly to the brake cylinder under the control of the motorman's valve which may connect the brake cylinder either with the air reservoir or the atmosphere.

In the drawings, Figure 1 is a side elevation of an electric car equipped with my system, showing also a ground device for automatically applying the brake; Fig. 2 is a diagrammatic view of the parts constituting the present invention.

As shown in the drawings, A indicates a car or vehicle, B a trackway, C a normally stationary peaked member or ramp adapted to operate the air valve on the car to start the application of the brake, and D a movable ramp which may be set into peaked position to counteract such air operation before it becomes effective, or may be lowered to idle position so that the brake application initiated by the ramp C becomes effective and stops the car. The controlling means consisting of the normally stationary brake-applying ramp and the movable counteracting ramp is claimed in my prior application No. 628,832, filed May 22, 1911.

Referring now to the vehicle equipment of the present invention, 1 indicates the main air reservoir, 2 the usual brake cylinder, 3 and 4 pipes leading from the reservoir and to the brake cylinder, and 5 an interposed valve. This valve has a passageway 6 adapted to connect the pipes 3 and 4 to allow the air from the reservoir to pass directly to the brake cylinder. It also has a passageway 7 adapted to connect the pipe 4 with a venting pipe 8 normally connected with the atmosphere to discharge the brake cylinder. This much of the construction is a usual one in direct air brake systems as employed on electric cars, the brake valve being an oscillatory device turned by a hand lever by the motorman. The normal position is that shown in Fig. 2.

In the ordinary equipment, the pipe 8 leads directly to the atmosphere. In my construction, coupled with this pipe is a pipe 10 leading to a valve casing 11, which has an atmosphere exit 12. I provide a by-pass pipe 13 between the pipe 10 and pipe 4, and I put a check valve 14 in this pipe 13 opening toward the brake cylinder. I connect the upper portion of the casing 11 with the pipe 3 by a pipe 15, which is normally closed by a valve 20. This valve is shown as a ball in the upper end of a stem 31, the lower end of which bears against a lever 22, which holds the ball normally against its seat.

It will be understood from the above description that my additional mechanism does not interfere with the normal operation of the valve 5. The pipe 8 is normally vented to the atmosphere the same as usual, and the pipe 3 is closed as usual, so that the motorman operates his valve just as if my automatic attachment were not present.

As stated, my automatic attachment coacts with the ramps C and D. I accomplish this through the mechanism which supports the valve stem 21 as follows: The lever 22 is pivoted at 23 to the arm 24 of a bent lever, which is pivoted on a stationary pivot 25 and has an arm 26 extending into position to engage the stationary ramp C. The other end of the lever 22 is supported on a hook 30, the upper end of which is pivoted to the lever 31, which lever is pivoted on a stationary pivot 32 and has a bell crank arm 33, to which is connected a spring 34, normally holding the lever and hook in the position shown in Fig. 2. The system of levers described normally holds the ball 20 against its upper seat, closing the pipe 15. When, however, the lever 26 rides over the stationary ramp C, the lever is swung upwardly, which swings the arm 24 to the left which draws the bar 22 off of the hook 30, so that this bar drops and with it the valve 20 under the pressure of the air in the pipe 15. This action releases the air from the main reservoir so that it may pass through the pipe 15 and the pipe 10, and via either the pipe 13 or the passageways 8, 7 and 4 to the brake cylinder 2. If the valve 20 is not returned to its upper seat, it drops onto the seat 35 provided in the casing 11 and closes the vents to the atmosphere so that the air from the reservoir continues to pass into the brake cylinder and apply the brake. In case, however, the resetting ramp D (which is farther from the rail than the stationary ramp) is in its clearing or peaked position, it is immediately engaged by an arm 37 pivoted at 38 and outside of the tripping arm 26. This arm 37 carries a projection 39 adapted to engage and raise the arm 33 of the lever 31. This moves the hook 30 downwardly so that it is swung under the bar 22 by means of the spring 40. Then, as the resetting arm clears the ramp D, the spring 34 raises the arm 31 and the bar 22 and returns the valve 20 to normal position.

It will be noted that the application of the brake by this automatic system is entirely independent of the position of the motorman's valve 5. If this valve is in normal position, the brake air may pass via the pipe 8 through the passageway 7 to the pipe 4; but, if the valve is in another position, the brake air can still pass via the passageway 13 and through the check valve to the brake cylinder. When the brake has been applied by this method, it is impossible for the motorman to release it by any operation of the valve 5. It is necessary for the car to come substantially to a stop, so that the bar 22 may be restored by hand at the side of the car, this bar being so positioned that it is only accessible to one on the ground.

It will be seen from the above description that my mechanism requires very small additions to the present direct air equipment on electric cars; that it does not in any way interfere with the ordinary operation of the motorman's valve; that when conditions on the track indicate danger, the brake is applied automatically, irrespective of the action of the motorman, and that, when once applied, it is impossible for the motorman to throw the brake until the car has come substantially to a stop.

Having thus described my invention, what I claim is:

1. In a brake applying mechanism for vehicles having a direct air system, the combination, with a brake cylinder, an air reservoir, a conduit between them and a hand valve controlling the passage of air through said conduit, of an automatically operating valve adapted to be opened and closed by means on the trackway and a normally closed conduit connecting the reservoir with the brake cylinder and adapted to be opened by the automatic valve independently of whether the hand valve be closed or open.

2. In a brake applying mechanism for vehicles having a direct air system, the combination, with a brake cylinder and air reservoir and hand valve, of an automatically operating valve adapted to connect the reservoir with the brake cylinder independently of the hand valve when operated by means on the trackway, a vent pipe from the hand valve, said automatically operating valve being connected with the vent pipe from the hand valve and itself having a vent and having a connection with the air reservoir.

3. The combination, with an air reservoir and brake cylinder, of a passageway between them and an interposed hand valve, a vent pipe from the hand valve, a valve casing connected with the vent pipe and having a venting opening, a connection with the reservoir from the valve casing, and a valve adapted to alternately close the venting opening or the connection with the reservoir.

4. The combination, with a brake cylinder and reservoir, of a passageway between them having an interposed hand valve, a vent pipe from the hand valve, a passageway between the vent pipe and the brake cylinder, a check valve in said passageway, and means for connecting the vent pipe with the atmosphere or with the reservoir.

5. The combination, with a brake cylinder and reservoir, of a connecting pipe between them and a hand valve interposed in said connecting pipe, a vent pipe from the hand valve, a casing connected with the vent pipe, an exit opening from the casing, connections from the casing to the reservoir, valve seats for the casing vent and for the reservoir connection, said seats being opposite each other, and a double-faced valve adapted to engage one seat or the other.

6. The combination, with a brake cylinder and reservoir, of a connecting pipe between them and a hand valve interposed in said connecting pipe, a vent pipe from the hand valve, a casing connected with the vent pipe, an exit opening from the casing, connections from the casing to the reservoir, valve seats for the casing vent and for the reservoir connection, said seats being opposite each other, a double-faced valve adapted to engage one seat or the other, said valve having a stem extending out of the casing, and automatic tripping mechanism for normally supporting said stem but releasing it and returning it according to track conditions.

7. The combination, with an air reservoir and brake cylinder, of a hand brake valve for enabling direct air to pass from the reservoir to the cylinder, a vent passage from the valve, an automatic valve adapted to shut off the air vent from the hand valve and connect the reservoir with the brake cylinder, and tripping mechanism along the trackway for automatically operating said valve.

8. The combination, with a brake cylinder air reservoir, the hand valves and connecting pipes, whereby there may be a direct application of the air, of an air vent from the hand valve, an automatic valve adapted to enable a direct application of the air and close the vent pipe from the cylinder, tripping mechanism normally holding the automatic valve in idle position, resetting mechanism adapted to restore said valve when tripped, and normally stationary and movable ramps along the trackway adapted to coact with the tripping mechanism and resetting mechanism respectively to operate the automatic valve.

9. The combination, with a vehicle, of an air reservoir, a brake cylinder, a hand valve, and suitable conduits connecting it with said reservoir and brake cylinder, a second valve, and a conduit for establishing communication between said reservoir and brake cylinder and adapted to be opened and closed by said second valve irrespective of whether the hand valve be open or closed, and means along the trackway for automatically operating said second valve.

10. The combination of a vehicle, an air reservoir, a brake cylinder, a hand valve, suitable conduits connecting it with said reservoir and brake cylinder, a second valve, conduits controlled thereby and communicating respectively with said reservoir and brake cylinder, and a conduit between said second valve and the hand valve, the hand valve being adapted to couple the last mentioned conduit with the brake cylinder when said hand valve interrupts the communication between the first mentioned conduits.

11. The combination of a vehicle, an air reservoir, a brake cylinder, a hand valve, suitable conduits connecting it with said reservoir and brake cylinder, a second valve, conduits controlled thereby and communicating respectively with said reservoir and brake cylinder, a conduit between said second valve and the hand valve, the hand valve being adapted to couple the last mentioned conduit with the brake cylinder when said hand valve interrupts communication between the first mentioned conduits, and a device carried by the vehicle and adapted to normally maintain said second valve closed but adapted to be operated to open the second valve, and means along the trackway for operating said device.

In testimony whereof, I hereunto affix my signature in the presence of two witnesses.

ELMER M. JONES.

Witnesses:
  ALBERT H. BATES,
  JUSTIN W. MACKLIN.

Copies of this patent may be obtained for five cents each, by addressing the "Commissioner of Patents, Washington, D. C."